United States Patent [19]

Yoshino

[11] Patent Number: 4,931,827
[45] Date of Patent: Jun. 5, 1990

[54] PHOTOMETER FOR REPRODUCTION MACHINE

[75] Inventor: Tatsuo Yoshino, Kanagawa, Japan

[73] Assignee: Fuji Photo Film Co., Ltd., Kanagawa, Japan

[21] Appl. No.: 256,423

[22] Filed: Oct. 11, 1988

[30] Foreign Application Priority Data

Oct. 9, 1987 [JP] Japan .................. 62-255047

[51] Int. Cl.$^5$ .................................................. G03B 27/72
[52] U.S. Cl. ......................................... 355/38; 38/71; 38/68
[58] Field of Search ............ 355/38, 68, 71, 67, 355/326, 327; 356/222, 225

[56] References Cited

U.S. PATENT DOCUMENTS 3,819,373 6/1974 Sable ........................ 355/35 X
4,395,108 7/1983 Morse ........................ 355/38 X
4,655,579 4/1987 Adachi et al. .............. 355/327 X Primary Examiner—L. T. Hix
Assistant Examiner—D. Rutledge
Attorney, Agent, or Firm—Sughrue, Mion, Zinn, Macpeak & Seas

[57] ABSTRACT

A photometer for a reproduction machine in which the light reflected from a document, illuminated with light through a slit, is condensed by a condensing lens, the condensed light is diffused by a diffusion plate, and then the diffused light is detected by a plurality of sensors for a photometric test. The sensors are arranged along the width of an image of the document formed through the slit. Therefore, a reliable photometric test can be made even on such a document which has different colors on opposite sides of the intermediate portion of the slit along its length.

14 Claims, 8 Drawing Sheets

F I G. 1
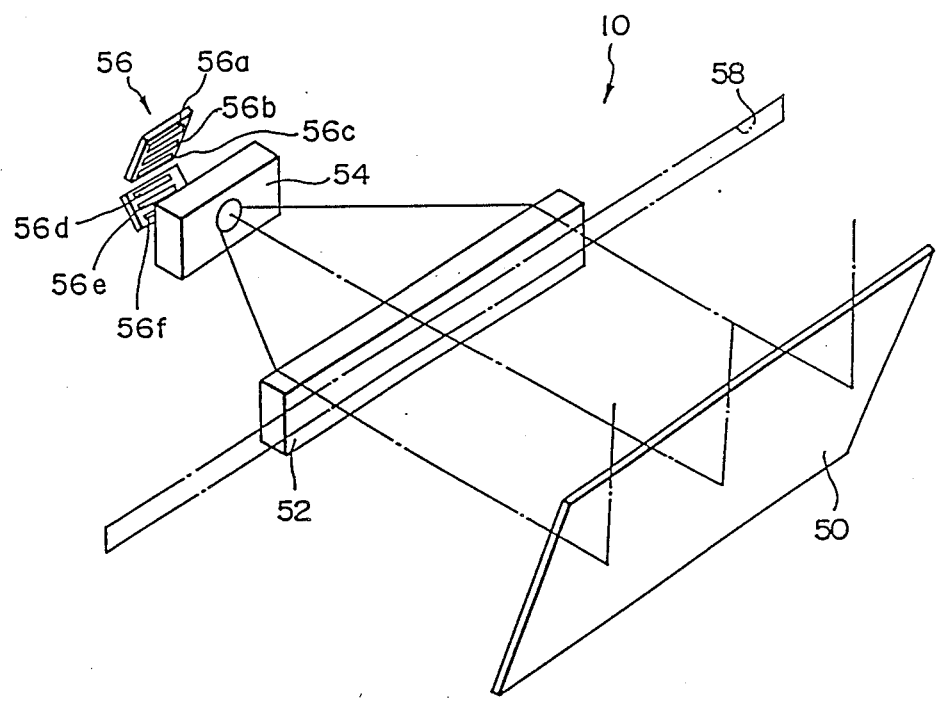

PHOTOMETER FOR REPRODUCTION MACHINE

BACKGROUND OF THE INVENTION

1. Field of the Invention

The present invention relates to a photometer for reproduction machines, and more particularly to, a photometer for use in color reproduction machines suited to reproduce color documents having half tone, such as electrophotographic color reproduction machines, silver salt photographic color reproduction machines (optical printers) using reversal color paper, diffusion transferring photosensitive materials, etc., heat sensitive transferring color reproduction machines, ink jet color printers, and laser color printers, for example.

2. Description of the Related Art

While color reproduction machines have extensively been used in these days, they are required to finish the copy that is good not only in density but also in color balance. Photographs and prints are employed as color documents for such color reproduction machines in many cases, but the copied images of these documents will be different in color balance when copied under the same reproducing conditions, because of difference in color materials used and discrepancy between visual sensitivity and spectroscopic sensitivity of reproducing materials. For example, in color printed documents, the spectroscopic density profile of magenta ink is overlapped with that of cyan ink to a large extent. Therefore, when color reproduction machines are set to such reproducing conditions as suited to finish color printed documents with good quality, those reproducing conditions become less effective in developing the magenta density because the color printed documents have higher magenta density. Accordingly, if color photographic documents are copied under those reproducing conditions thus set, the copied color images would be deficient in magenta color and rich in green color.

In order to solve the foregoing problem, heretofore, different reproducing conditions (such as color filter adjusting amount, exposure amounts, charged amounts, development bias amounts) have been set in color reproduction machines dependent on color photographic documents and color printed documents. Then, operators touch the selection keys at their own discretion to select the reproducing conditions suitable for the type of color documents to be copied.

However, the type of color documents is judged based on the experience of individual operators, so it is difficult for those operators having no expert knowledge to correctly discriminate between color photographs and color prints produced therefrom, because of recent rapid advance of color printing technology.

For the reason, it has been proposed to discriminate between color photographs and color prints by previously making a photometric test (pre-scan) on the color document before it is copied. Such a preparatory photometric test on a color document is carried out by moving the color document and a slit relative to each other for scanning, and condensing the light reflected from the color document onto a detection sensor. The detection sensor has respective spectroscopic sensitivity corresponding to three primary colors in the color document, and the density values of three primary colors obtained by the detection sensor are employed to judge whether the color document is a color photograph or a color print.

However, where a color document has different colors on opposite sides of the intermediate portion of a slit along its length, the type of the color documents may not be judged correctly dependent on arrangement of the detection sensor. For example, when colors of a color document 11 are different in opposite sides of the intermediate portion of a slit 58 along its length, as shown in FIG. 12, i.e., when color of an area A in FIG. 12 is different from that of an area B, the type of the color document may not be determined correctly dependent on arrangement of the detection sensor.

SUMMARY OF THE INVENTION

In view of the foregoing status in the art, it is an object of the present invention to provide a photometer for reproduction machines with which a photometric test can reliably be made on even a color document that has different colors on opposite sides of the intermediate portion of a slit along its length.

To achieve the above object, the present invention resides in a photometer for a reproduction machine in which a document illuminated by a light source and a slit are relatively moved for scanning, to thereby make a photometric test on the document through the slit, the photometer being featured in comprising a condensing lens for condensing the reflected light from the document, diffusion means for diffusing the light condensed by the condensing lens, and detection means for detecting the light diffused by the diffusion means.

According to the present invention, the light reflected from the document and passing through the slit is condensed by the condensing lens and then impinges on the diffusion means. The diffusion means serves to diffuse the light incident thereon, so that the light having been extended along the length of the slit is uniformly diffused over a small area. The diffused light is then sensed by the detection means for a photometric test. In the present invention, the detection means comprises a plurality of photometric means. With these photometric means arranged along the width of the image formed through the slit, a more reliable photometric test can be made on even those color documents which have different colors on opposite sides of the intermediate portion of the slit along its length.

BRIEF DESCRIPTION OF THE DRAWINGS

FIG. 1 is an exploded perspective view showing a photometer for reproduction machines according to the present invention;

DESCRIPTION OF THE PREFERRED EMBODIMENTS

Figure 2:
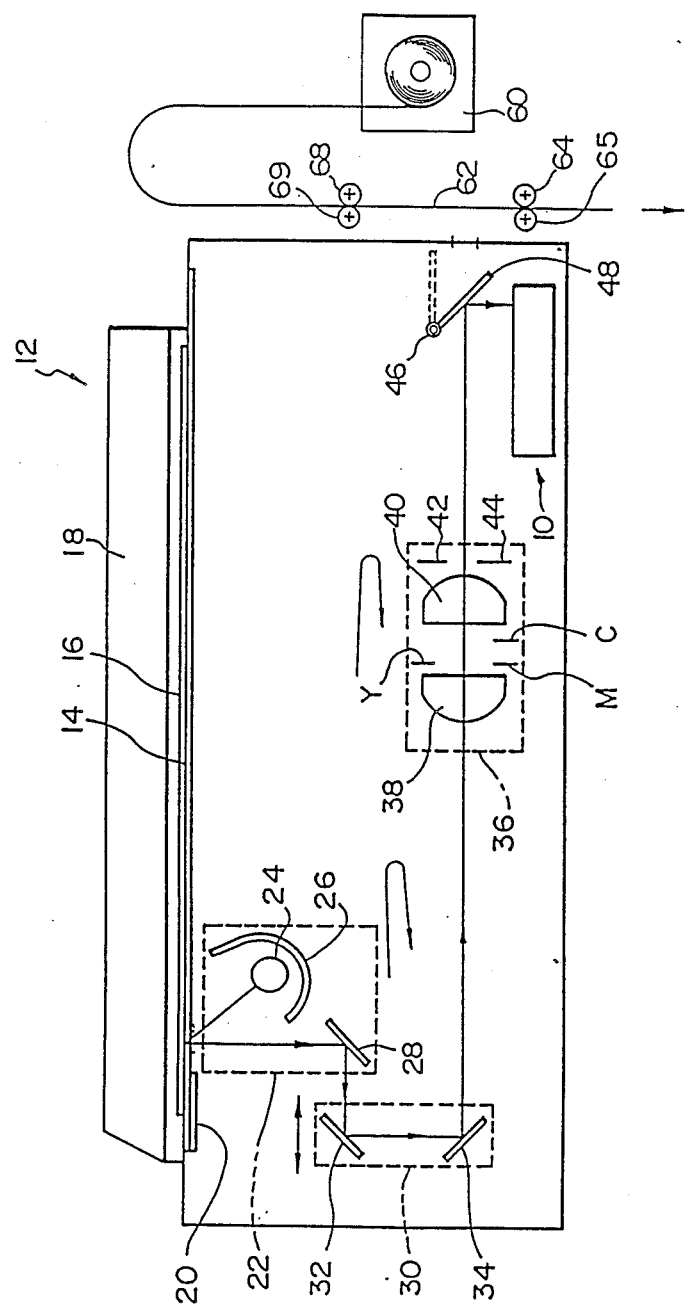
FIG. 2 is a schematic view showing the configuration of a silver salt photographic color reproduction machine for which the present invention is used.
Figure 3:
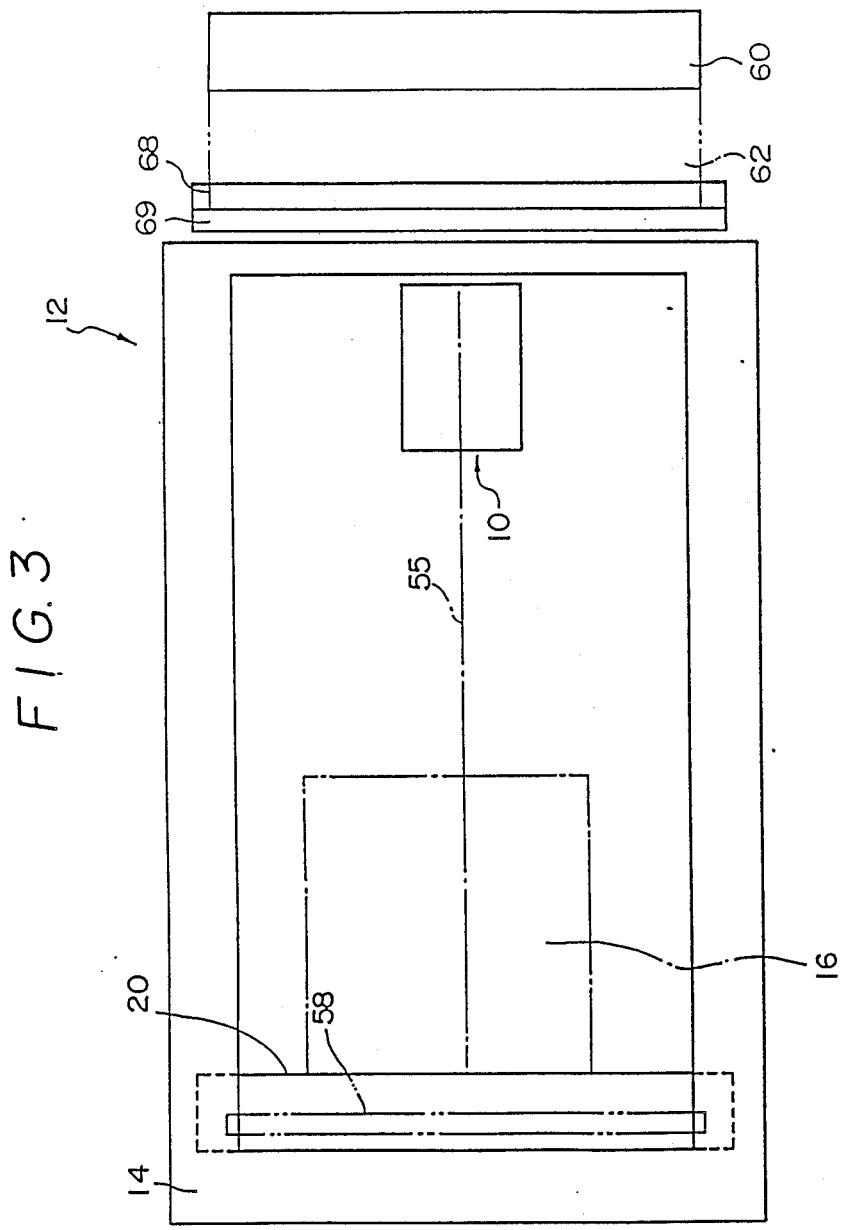
FIG. 3 is a plan view of FIG. 2.

FIGS. 2 and 3 are schematic views showing the configuration of a silver salt photographic color reproduction machine 12 for which a photometer 10 for reproduction machines according to the present invention is used. FIG. 2 is a sectional view and FIG. 3 is a plan view.

On a transparent document glass plate 14, as shown in FIG. 2, there is placed a color document 16 with its surface to be copied facing downward. The color document 16 is pressed from above by a document presser plate 18 having the white lower surface. A white reference plate 20 is attached to the underside of the document glass plate 14 at the left end. As described later, changes in property of a light source and color filters over a period of time can be corrected by measuring the light reflected from the reference plate 20.

A light source unit 22 houses therein a light source 24, a reflector 26 and a mirror 28, and is reciprocally moved in parallel to the document glass plate 14 for illuminating the color document 16 through a slit. A mirror unit 30 holds thereon two mirrors 32, 34 each extending in the direction normal to the drawing sheet, and turns the light emitted from the light source unit 22 back in parallel. Incidentally, the mirror unit 30 can be shifted in the directions of arrows when the copying size is changed for magnification or reduction.

For correcting a deviation of the focus point caused by the reciprocal movement of the light source unit 22, a lens unit 36 is moved back and forth along the optical axis in synchronous relation with the light source unit 22. The lens unit 36 comprises a front lens group 38 and a rear lens group 40 with a yellow filter Y, a magenta filter M and a cyan filter C all interposed therebetween. These color filters Y, M, C are movable in a direction perpendicular to the optical axis, so that property of the slit light can be adjusted dependent on respective inserted amounts of the color filters into the optical axis to thereby correct color balance. Behind the rear lens group 40, there is disposed a pair of stop plates 42, 44 movable in the opposite directions.

Having passed through the lens unit 36, the light reaches an optical path selector mirror 48 which is turnable about a shaft 46. During pre-scan, the optical path selector mirror 48 is turned into the optical path as indicated by solid lines FIG. 2, so that the reflected light from the color document 16 is introduced to the photometer 10 of the reproduction machine.

Figure 4:
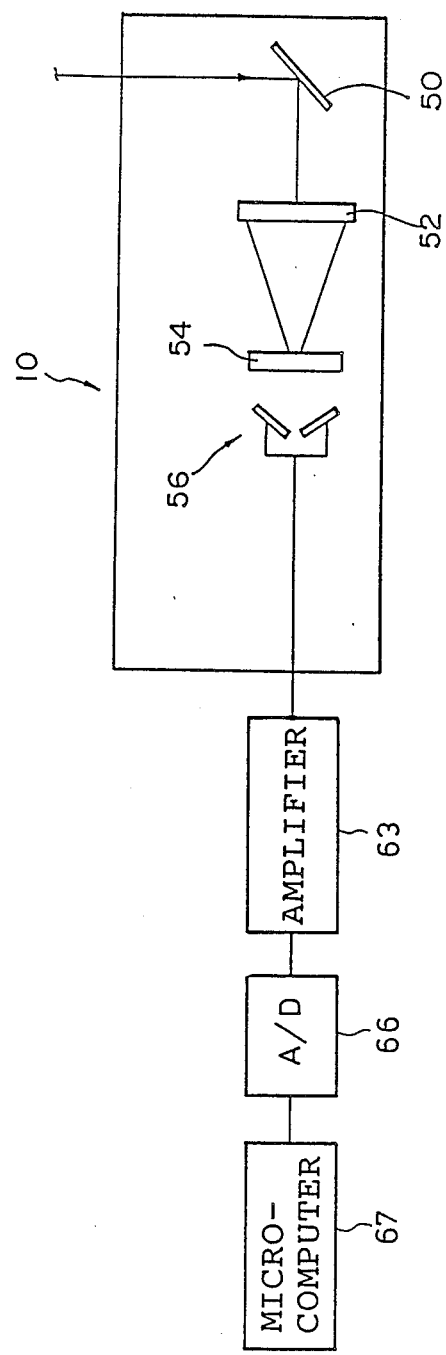
FIG. 4 a front view showing details of the photometer for reproduction machines.

Within the photometer 10 of the reproduction machine, as shown in FIGS. 1 and 4, there is disposed a mirror 50 for directing the reflected light from the color document 16 substantially in parallel to the color document 16, i.e., in the horizontal direction, following reflection at the optical path selector mirror 48. A condensing lens 52 is disposed on the imaged surface in front of the mirror 50, and a diffusion plate 54 is disposed in a further forward position.

The condensing lens 52, comprising a Fresnel lens, condenses the slit light from the color document 16 to be introduced to the diffusion plate 54. The diffusion plate 54 is formed of frosted glass, for example, and diffuses the condensed slit light. The diffused slit light impinges on a sensor unit 56 as photometric means.

As shown in FIG. 3, the central position of the condensing lens 52 (the central position of a slit image 58 along its length) is aligned with the optical axis 55. In view of the fact that most color documents are not smaller than the E size of photographs, the width of incident light on the condensing lens 52 is preferably about 10 cm to make less an adverse effect of the light reflected from the document presser plate 18 and to extract as many distinct features of the color document as possible.

As shown in FIG. 1, the sensor unit 56 comprises a first red sensor 56a, a second red sensor 56b, a first green sensor 56c, a second green sensor 56d, a first blue sensor 56e, and a second blue sensor 56f.

These sensors 56a–56f are constituted such that red, green and blue filters are disposed in the light image receiving surfaces of photoelectric converters to form red, green and blue sensors, respectively.

Figure 8:
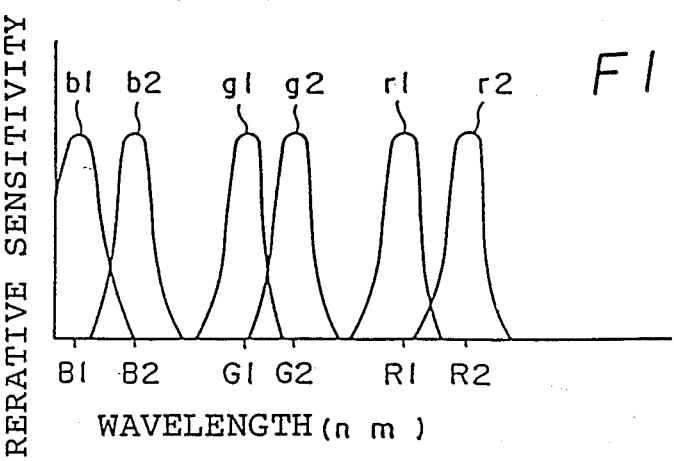
FIG. 8 shows graphs of relative sensitivity of sensors.

The first red sensor 56a is formed of a sensor which has a sensitivity curve r1 in FIG. 8, and the second red sensor 56b is formed of a sensor which has a sensitivity curve r2. The first green sensor 56c is formed of a sensor which has a sensitivity curve g1, and the second green sensor 56d is formed of a sensor which has a sensitivity curve g2. The first blue sensor 56e is formed of a sensor which has a sensitivity curve b1, and the second blue sensor 56f if formed of a sensor which has a sensitivity curve b2. As will be seen from FIG. 1, these sensors 56a–56f are arranged to extend in the widthwise direction of the slit image 58.

A photosensitive material 62 wound into the form of a roll is accommodated in a magazine 60. Having been drawn out of the magazine 60 by a certain length, the photosensitive material 62 is cut off by a cutter (not shown) and then stopped at a position where the distal end of the material 62 is held between a pair of rollers 68, 69. Another pair of rollers 64, 65 are arranged in vertically spaced and opposite relation to the pair of rollers 68, 69. A slit exposure position is formed between the upper and lower pairs of rollers 68, 69 and 64, 65, and the light from the lens unit 36 impinges on the photosensitive material 62 therethrough.

Having been exposed with the light from the lens unit 36, the photosensitive material 62 is sent to a processing section (not shown) for respective processes of developing, bleaching and fixing, and washing. After drying, the processed material is delivered onto a take-away tray (not shown).

Figure 5:
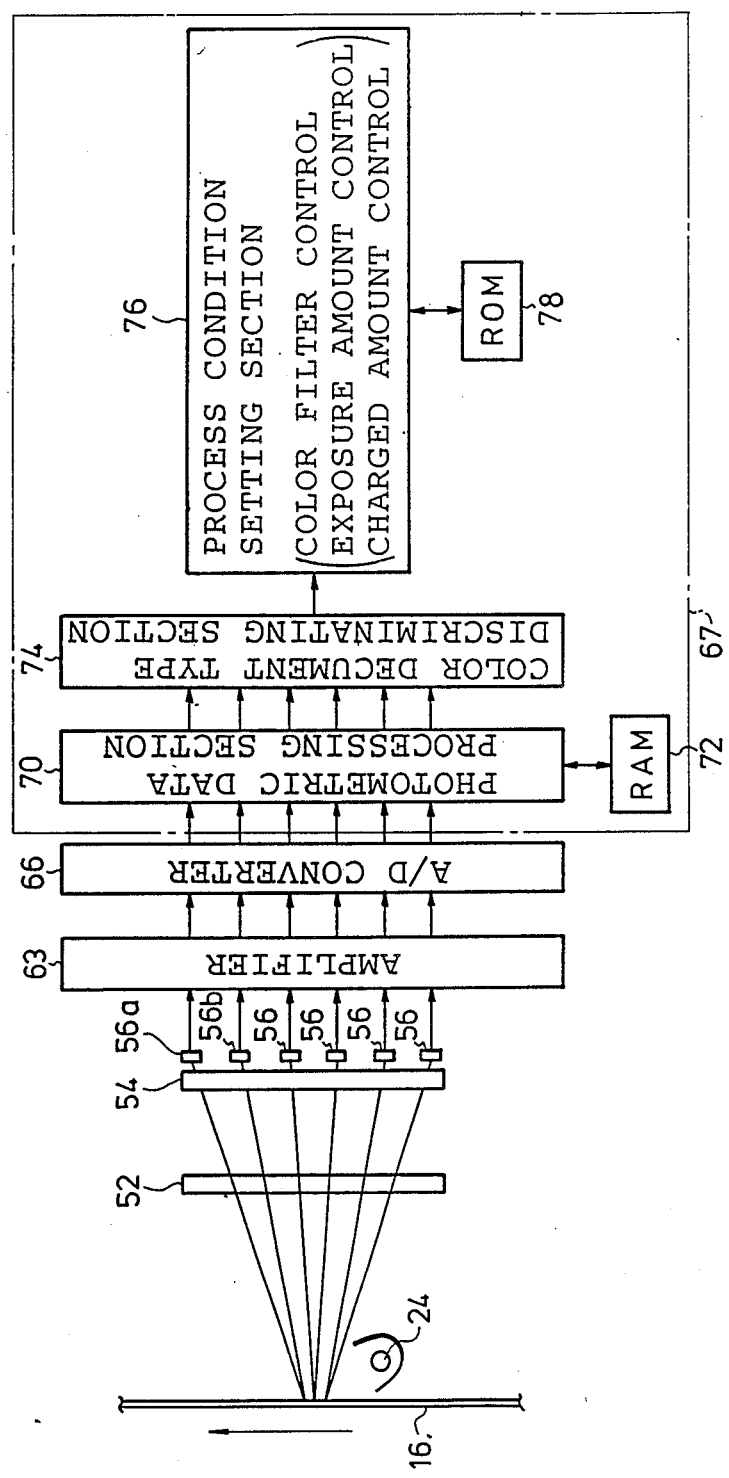
FIG. 5 is a block diagram showing a control system of the silver salt photographic color reproduction machine.

A control system for the photometer 10 of the reproduction machine will not be described. FIG. 5 is a schematic view showing the configuration of the control system for the photometer 10 of the reproduction machine. Prior to color copying, pre-scan is performed during which time the light emitted from the light source 24 is illuminated onto the color document 16 while moving the color document 16 in the direction of an arrow. The reflected image from the color document is measured by the respective sensors 56a–56f through the condensing lens 52.

Such measurements during the movement of the color document 16 is intermittently carried out with a certain period. For improvement in accuracy, it is preferable to make the measurements at such a period as allowing the successive images to partly overlap with each other.

The sensors 56a–56f are connected to an amplifier 63 which is in turn connected to an A/D converter 66. The A/D converter 66 is connected to a photometric data processing section 70 in a microcomputer 67. The photometric data processing section 70 is connected to a RAM 72 and stores therein two values of density signals for each of R, G, B colors after having been converted thereto through the A/D converter 66. After pre-scan, the photometric data processing section 70 reads two values of density signals for each color out of the RAM 72 for comparison of the two values. The compared result is sent to a color document type discriminating section 74 to judge the type of color documents therein.

The color document type discriminating section 74 is connected to a process condition setting section 76 for sending the judged result on the type of color documents thereto, whereupon the process conditions corresponding to the judged type of color documents is read out of a ROM 78 and then set. The process conditions thus set control operation of the reproduction machine so as to provide the copied image with good quality dependent on the type of color documents, and are of course different for each of color reproduction machines. In general, the copying conditions such as the type of color filters, exposure amount, charged amount, and development bias amount are controlled to achieve good density and color balance.

Herein, color documents subjected to a photometric test by the photometer 10 of the reproduction machine according to the present invention will be described with reference to FIGS. 6 and 7.

Figure 6:
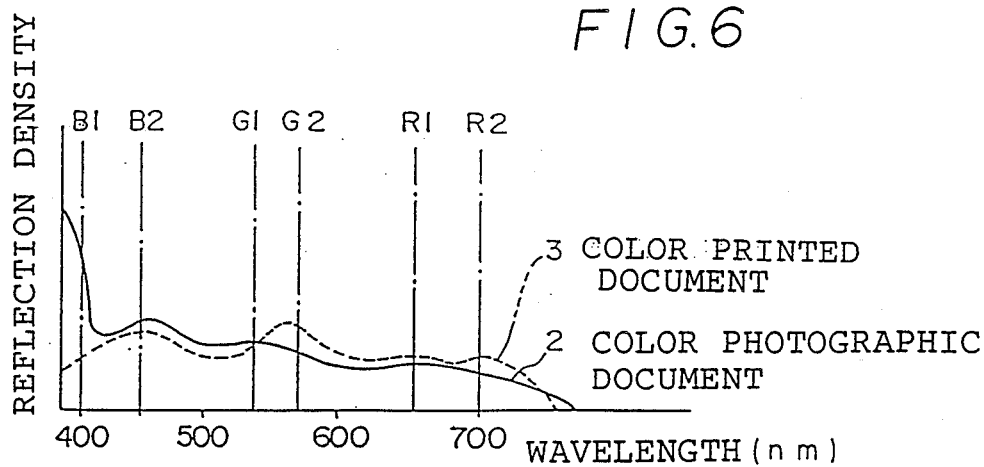
FIG. 6 shows graphs of spectroscopic reflection density of a color photographic document and a color printed document on each of which a color document of low density is recorded.

FIG. 6 shows spectroscopic reflection density of a color photograph and a color print each containing a color document of low density recorded thereon and having an average color profile. A density curve 2 indicated by a solid line represents a density profile of the color photograph, and a density curve 3 indicated by a dotted line represents a density profile of the color print.

Figure 7:
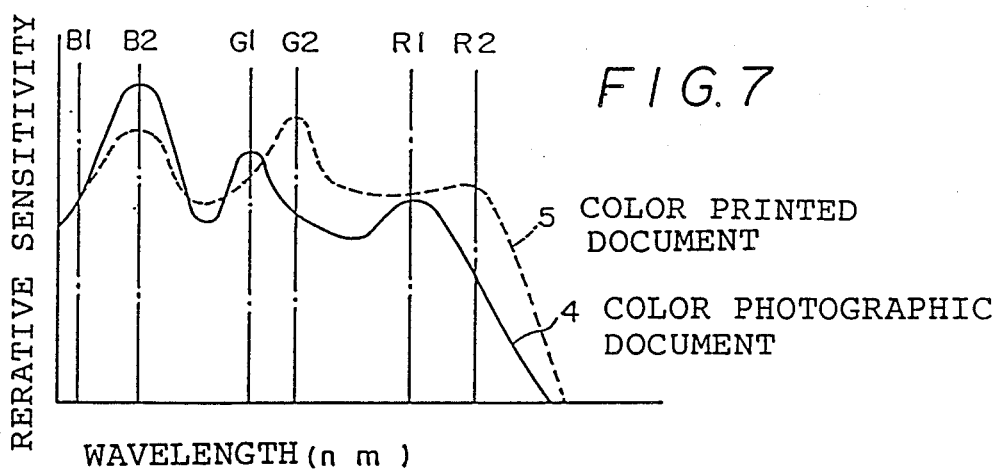
FIG. 7 shows graphs of spectroscopic reflection density of a color photographic document and a color printed document on each of which a color document of medium or high density is recorded.

FIG. 7 shows spectroscopic reflection density of a color photograph and a color print each containing a color document of medium or high density recorded thereon and having an average color profile. A density curve 4 indicated by a solid line represents a density profile of the color photograph, and a density curve 5 indicated by a dotted line represents a density profile of the color print.

As will be seen from FIGS. 6 and 7, the color photograph of low density exhibits a fairly large difference in the reflection density between about 400 nm and about 450 nm. This is because a medium having the maximum density (maximum absorption) approximately 380 nm is employed and hence an effect of this medium appears to a large extent in the low density range. To the contrary, the reflection density of the color photograph of medium or high density at about 400 mn and about 450 nm are opposite in the magnitude to that in the above case.

Further, magenta and cyan pigments employed in the color photograph exhibit the maximum density (maximum absorption) in range of 530 nm–560 nm and approximately at 650 nm, respectively. In addition, the magenta and cyan pigments have such characteristics that the density (absorption) is abruptly lowered in magnitude from the maximum absorption wavelength on both sides thereof.

On the other hand, magenta ink employed in the color print has the maximum density approximately at 570 nm. Cyan ink has substantially flat density in a range of 600 nm–700 nm, and exhibits more abrupt reduction in density than cyan pigments of the color photograph in a wavelength range longer than 700 nm.

Since the density profiles are different dependent on the type of color documents as mentioned above, the type of the color document used can be discriminated with high reliability by checking the spectroscopic intensity or reflection density of the color document with the sensor unit 56 having the sensitivity characteristics as shown in FIG. 8. Referring to FIG. 8, the curve b1 represents a sensitivity curve of the first blue sensor for measuring blue one of three primary color lights, and has a sensitivity peak at the wavelength B1 (e.g., 400±30 nm). The curve b2 represents a sensitivity curve of the second blue sensor for measuring blue one of three primary color lights, and has a sensitivity peak at the wavelength B2 (e.g., 450±30 nm).

The curve g1 represents a sensitivity curve of the first green sensor for measuring green one of three primary color lights, and has a sensitivity peak at the wavelength G1 (e.g., 540±15 nm). The curve g2 represents a sensitivity curve of the second green sensor for measuring green one of three primary color lights, and has a sensitivity peak at the wavelength G2 (e.g., 570±15 nm).

The curve r1 represents a sensitivity curve of the first red sensor for measuring red one of three primary color lights, and has a sensitivity peak at the wavelength R1 (e.g., 630±40 nm). The curve r2 represents a sensitivity curve of the second red sensor for measuring red one of three primary color lights, and has a sensitivity peak at the wavelength R2 (e.g., 680±40 nm). Incidentally, it is desired to set the peak wavelength R2 to 700±20 nm if the peak wavelength R1 is given by 650±20 nm, or to set the peak wavelength R2 to 660±20 nm if the peak wavelength R1 is given by 610±20 nm.

Operation of this embodiment will now be described.

First, the color document 16 is to be copied is placed on the document glass plate 14 and pressed from above by the document presser plate 18. Turning on a reproduction key (not shown) starts feeding of the photosensitive material 62 and pre-scan.

More specifically, the photosensitive material 62 is drawn out of the magazine 60 by a certain length and then cut off by the cutter (not shown). Thereafter, it is stopped at the slit exposure position while being held between the pair of rollers 68, 69.

When starting pre-scan, first the color filters Y, M, C are set in their reference positions and the stop plates 42, 44 are also set in their reference positions. After that, the optical path selector mirror 48 is inserted into the optical path to be set in the position as indicated by the solid line in FIG. 2. In this state, the light source unit 22 and the mirror unit 30 are moved in synchronous relation to start pre-scan.

At the beginning of the pre-scan, the light emitted from the light source 24 is first reflected by the reference plate 20, and then enters the lens unit 36 after passing trough the mirrors 28, 32, 34 successively. The light having passed through the lens unit 36 is reflected by the optical path selector mirror 48 to impinge on the photometer 10 of the reproduction machine.

The incident light to the photometer 10 of the reproduction machine is condensed by the mirror 50 and the condensing lens 52 to enter the diffusion plate 54. The light having entered the diffusion plate 54 is diffused and then impinged on the sensor unit 56. Moving at a constant speed, the light source unit 22 illuminates, through a slit, the color document 16 following the reference plate 20. The reflected light from the color document 16 is also measured by the sensor unit 56. After the completion of pre-scan, the light source unit 22 and the mirror unit 30 are returned to their initial positions as shown in FIG. 2. At the same time, the optical path selector mirror 48 is retreated from the optical path to turn back to the position as indicated by the chain line in FIG. 2.

By measuring the reflected light from the reference plate 20 through a slit with the sensors 56a-56f of the sensor unit 56, there are obtained a total of six type values of reflection density for each of slit areas, in pair for every blue, green and red colors. These six type values of reflection density are added and divided by the number of values to calculate respective arithmetic averages for every colors, thereby obtaining the blue, green and red density. Since the reference plate 20 has density of respective three colors all known beforehand, changes in property of the light source 24 over a period of time can be detected based on a deviation between the known density of each of three colors and the current density thereof obtained by the pre-scan measurement.

As to the color document 16, a total of six type values of reflection density are also obtained for each of slit areas.

Figure 10:
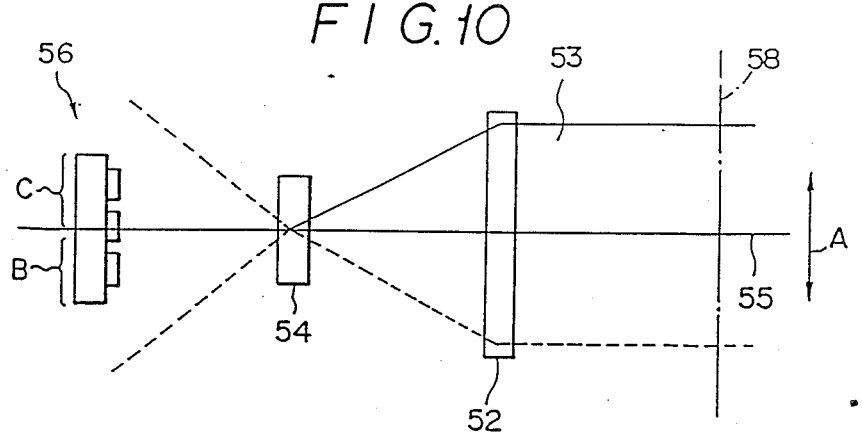
FIG. 10 is a top plan view showing the state of incident light and the position of a detection sensor in case where the color document has different colors along the length of a slit.
Figure 12:
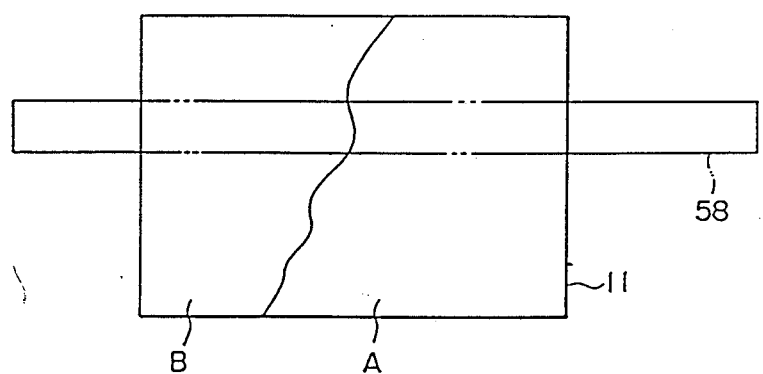
FIG. 12 is a front view showing the positional relationship between the color document and the slit in case where the color document has different colors along the length of the slit.

There will now be described the case of making a photometric test on a color document (FIG. 12) which has different colors on opposite sides of the intermediate portion of the slit 58 along its length (in the direction of an arrow A in FIG. 10). For example, when the color document 16 having two white and black colors are measured, only white light 53 out of the reflected light from the color document is condensed by the condensing lens 52 and then impinges on the sensor unit 56 through the diffusion plate 54, as shown in FIG. 10, because the black portion is assumed not to reflect the light therefrom. The white light 53 is focused by the condensing lens 54 and hence enters the diffusion plate 54 obliquely with respect to the optical axis 55. After passing through the diffusion plate 54, the white light is diffused about a portion B on the sensor unit 56 and then enters the sensor unit 56. Therefore, if a plurality of sensors adapted to detect respective lights of different wavelengths are arranged along the length of the slit 58 (in the direction of the arrow A) with the optical axis 55 locating at the center, the sensor arranged in a C portion of the sensor unit 56 could not detect the white light 53 with less error.

Figure 11:
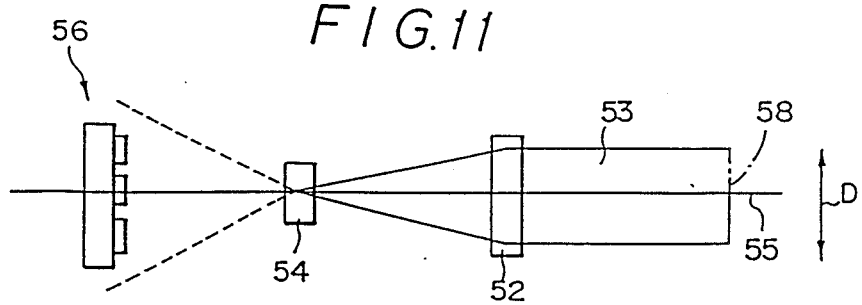
FIG. 11 is a front view of FIG. 10.

However, as shown in FIG. 11, the white light 53 also enters the diffusion plate 54 along the optical axis 55 while extending along the width of the slit 58 (in the direction of an arrow D in FIG. 11), and after passing through the diffusion plate 54, it impinges on the sensor unit 56 while being substantially uniformly diffused about the optical axis 55. Thus, by arranging a plurality of sensors adapted to detect respective lights of different wavelengths are arranged along the width of the slit 58 (in the direction of the arrow D in FIG. 11) with the optical axis 55 locating at the center, the white light 53 can be detected without error.

In this embodiment, therefore, the plurality of sensors 56a-56f adapted to detect respective lights of different wavelengths are arranged along the width of the slit image, so that respective colors of the color document 16 which are different on opposite sides of the intermediate portion of the slit 58 along its length (in the direction of the arrow A in FIG. 10) can be measured reliably.

An example of discriminating the type of color documents by making use of photometric values measured by the sensors will now be described with reference to FIG. 9.

Figure 9:
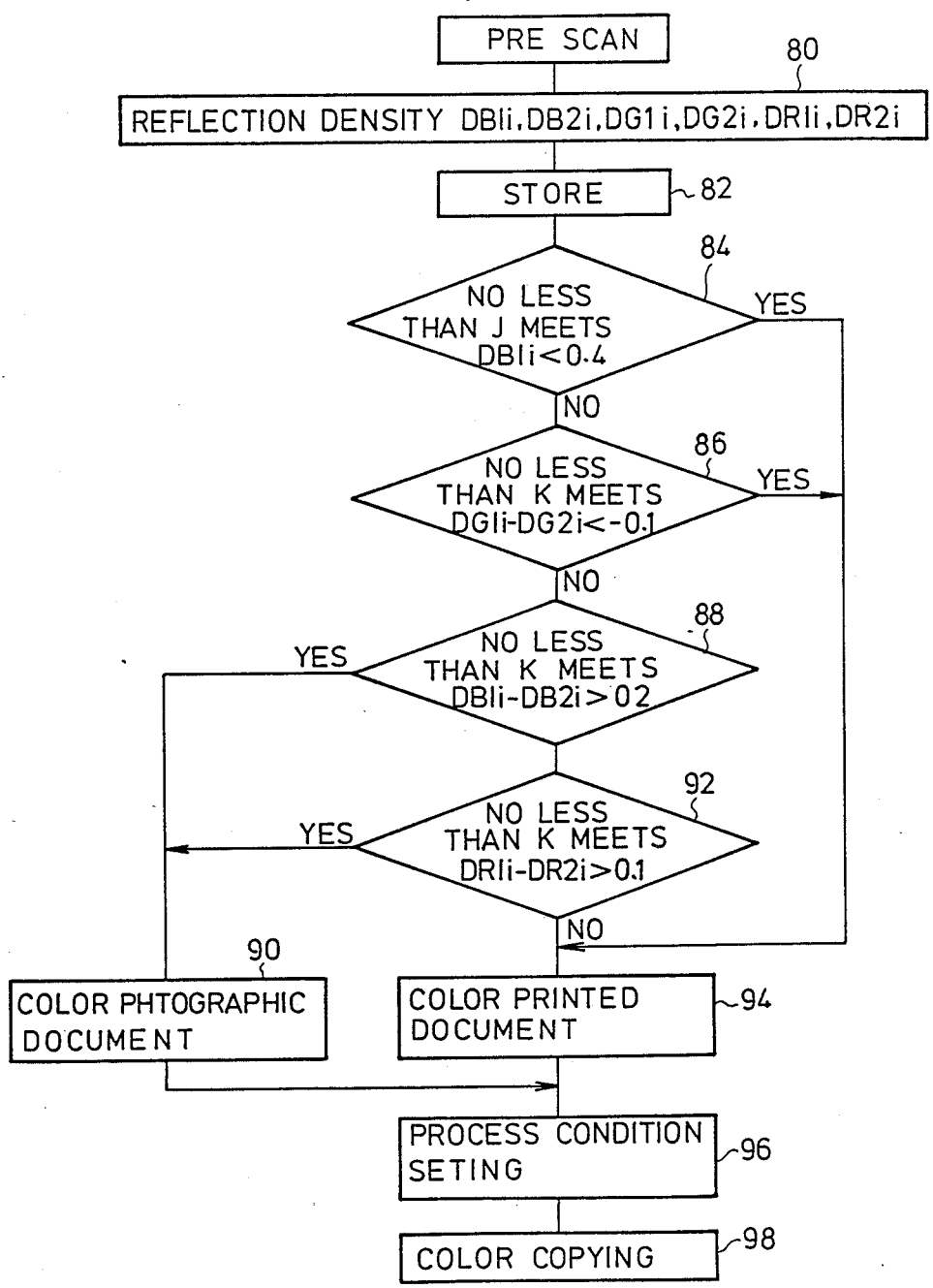
FIG. 9 is a flow chart showing one example of a method of discriminating the type of color documents.

FIG. 9 shows one example of discriminating the type of color documents. In step 80, two type values of blue density DB1i, DB2i and two type values of green density DG1i, DG2i are measured for each of slit areas using the sensors 56a-56f, and then stored in step 82. After pre-scan, respective values of blue density DB1i are sequentially read out for every slit areas, and those values of DB1i which meet the following conditional inequality are extracted:

$$DB1i < 0.4 \qquad (1)$$

If the number of DB1i meeting the conditional inequality (1) is equal to or larger than J, the color document is determined as a color printed document. Herein, the value of J may be "1". This determination is based on the difference in reflection density between a color printed document and a color photographic document.

If there is no DB1i meeting the conditional inequality (1), it is determined in step 86 as to whether the following conditional inequality (2) will be met:

$$DG1i - DG2i > -0.1 \qquad (2)$$

If the number of value pairs meeting the conditional inequality (2) is equal to or larger than K, the color document is determined as a color printed document. The conditional inequality (2) is based on the characteristic of color printed documents of high density.

If the number of value pairs meeting the conditional inequality (2) is smaller than K, it is determined in step 88 as to whether the following conditional inequality (3) will be met:

$$DB1i - DB2i > 0.2 \qquad (3)$$

If the number of value pairs meeting the conditional inequality (3) is equal to or larger than K, the color document is determined as a color photographic document in step 90. This determination is based on the characteristic of color photographs of low density.

If the number of value pairs meeting the conditional inequality (3) is smaller than K, it is determined in step 92 as to whether the following conditional inequality (4) will be met:

$$DR1i - DR2i > 0.1 \qquad (4)$$

The above conditional inequality (4) is based on difference in the characteristic between color printed documents and color photographic documents of medium or high density. If the number of value pairs meeting the conditional inequality (4) is equal to or larger than K, the color document is determined as a color photographic document in step 90. Otherwise, the color document is determined as a color printed document in step 94. The value of K is determined empirically. For example, the value of K is set equal to 20% of all measured value pairs.

The conditional inequality (4) is effective when the sensitivity curve r1 has the maximum sensitivity at 650 nm±20 nm and the sensitivity curve r2 has the maximum sensitivity at 700 nm±20 nm. But, when the sensitivity curve r1 has the maximum sensitivity at 610 nm ±20 nm and the sensitivity curve r2 has the maximum sensitivity at 660 nm±20 nm, it is advantageous to use the following conditional inequality (4'):

$$DR1i - DR2i \leq 0.0 \tag{4'}$$

This conditional inequality (4') is based on the fact that spectroscopic overlap between magenta ink and cyan ink of color printed documents is larger than that of color photographic documents.

In determining the type of color documents, it is also advantageous to select application of the above conditional inequalities (2)-(4') based on the difference or ratio between at least two out of blue, green and red density. The reason is in that because yellow, magenta and cyan pigments have their respective useless absorptions, an effect of any of such useless absorptions will appear in those color documents in which three colors are largely unbalanced. For example, an image of blue sky or so is mainly composed of cyan pigments that exhibit a useless absorption approximately at 400 nm. Therefore, in case of:

$$DR1i - DR2i > 0.5$$

or $$DR1i - (DG1i + DB2i)/2 > 0.5,$$

the discriminating accuracy can be improved by making determination of the conditional inequality (4) rather than that of the conditional inequality (3), or removing the relevant measured values from the data to be used for determination.

While the difference in density is employed in this embodiment for comparing the measured values of density for the same color, the ratio of density may instead be employed. For example, if the number of measured value pairs of red density which have the ratio ($R1i/R2i$) no less than "1.1" is equal to or larger than K, the color document is determined as a color photographic document. Otherwise, it is determined as a color printed document. Alternatively, the type of color documents can also be discriminated by making a statistic process of two type values of density. For example, when a histogram is prepared in which the axis of abscissas represents the density difference ($DG1-DG2$) and the axis of ordinate represents the number of measured value pairs, the peak value will be varied dependent on the type of color documents. So, by checking the peak value, the type of color documents can be discriminated.

Then, process conditions are set in step 96. For example, when the color document 16 has been determined as a color photograph, the inserted amounts of respective color filters for color photographic documents, which are stored in the ROM 78, are read out to adjust the actual inserted amounts of the color filters Y, M, C, respectively, thereby providing good color balance. On the contrary, when the color document 16 has been determined as a color print, the inserted amounts of respective color filters for color printed documents, which are stored in the ROM 78, are read out to adjust the actual inserted amounts of the color filters Y, M, C, respectively.

Then, six type values of reflection density obtained by measuring the color document 16 are added and divided by the number of measured value pairs to calculate the arithmetic averages for every colors, thereby obtaining the blue, green and red density. Based on density of respective three colors thus obtained, respective correction amounts of red, green and blue colors are calculated, as required, in order to provide better color balance. Known equations to calculate exposure amounts in photographic printing machines can be used for calculating those correction amounts. Added to or deduced from the exposure amounts of every colors thus obtained are additional correction amounts such as above-mentioned changes in property of the light source and the color filters over a period of time, features of the photosensitive materials used (e.g., types, variations per lot, elapse of time, and preserved condition), ambient temperature during copying, etc. In accordance with the calculated results, the inserted amounts of the yellow filter Y, the magenta filter M and the cyan filter C into the optical path are adjusted, respectively. If the necessary correction cannot be achieved even with full movement of the color filters Y, M, C, the stop plates 42, 44 are also adjusted for desired correction.

After the completion of adjustment of the color filters, the light source unit 22 is again moved in step 98 for illuminating the color document 16 through a slit. The rollers 64, 65, 68, 69 are rotated in synchronous relation with slit illumination, so that the photosensitive material 62 is continuously moved to be exposed through a slit. With this slit exposure, the image of the color document 16 is recorded onto the photosensitive material 62 for color copying.

After the image of the color document 16 is exposed and recorded onto the photosensitive material 62, the photosensitive material 62 is delivered to the processing section (not shown) where it is subjected to respective processes of developing, bleaching and fixing, and washing successively. Following the drying process, the photosensitive material 62 is taken out to complete copying of the color document 16 thereto.

As described above, according to the present invention, since the light reflected from the color document (slit light) is condensed by the condensing lens, diffused through the diffusion plate, and detected by the detection means adapted to respective light of different wavelengths, there can be attained a valuable advantage that a photometric test can reliably be made even for the color document which has different colors on opposite sides of the intermediate portion of the slit along its length.

What is claimed is:

1. A photometer for a reproduction machine in which a document, illuminated by a light source, and a slit are relatively moved for scanning, to thereby make a photometric test on said document through said slit, comprising:

a condensing lens for condensing the reflected light from said document;
diffusion means for diffusing the light condensed by said condensing lens; and detection means for detecting the light diffused by said diffusion means.

2. A photometer for a reproduction machine according to claim 1, wherein said detection means comprises a plurality of photometric means which have different peak values of detection sensitivity in light wavelength.

3. A photometer for a reproduction machine according to claim 2, wherein said plurality of photometric means are arranged along the width of an image formed through said slit.

4. A photometer for a reproduction machine according to claim 3, wherein said plurality of photometric means includes blue color photometric means for measuring blue light, green color photometric means for measuring green light, and red color photometric means for measuring red light.

5. A photometer for a reproduction machine according to claim 4, wherein each of said blue color photometric means, said green color photometric means and said red color photometric means includes two sensors which have different sensitivity peaks.

6. A photometer for a reproduction machine according to claim 1, wherein said condensing lens comprises a Fresnel lens.

7. A photometer for a reproduction machine according to claim 1, further comprising discrimination means for discriminating whether said document is a color printed document or a color photographic document, based on the values detected by said detection means.

8. A photometer for a reproduction machine in which a document and a slit are relatively moved for scanning, to make a photometric test by measuring the reflected light from said document illuminated with light through said slit, comprising:
   a condensing lens for condensing said reflected light;
   a diffusion plate for diffusing the light condensed by said condensing lens; and
   a sensor unit for detecting the light diffused by said diffusion plate.

9. A photometer for a reproduction machine according to claim 8, wherein said sensor unit comprises a plurality of photometric portions which have respective spectroscopic sensitivity corresponding to three primary colors.

10. A photometer for a reproduction machine according to claim 9, wherein said plurality of photometric portions are arranged along the width of an image formed through said slit.

11. A photometer for a reproduction machine in which a document and a slit are relatively moved for scanning, to make a photometric test by measuring the reflected light from said document illuminated with light through said slit, said photometer comprising:
   a condensing lens for condensing said reflected light;
   a diffusion plate for diffusing the light condensed by said condensing lens; and
   a sensor unit for detecting the light diffused by said diffusion plate, said sensor unit comprising a plurality of photometric portions arranged along the width of an image formed through said slit, said plurality of photometric portions having respective spectroscopic sensitivities corresponding to three primary colors, wherein said plurality of photometric portions each include two sensors which have different sensitivity peaks.

12. A photometer for a reproduction machine according to claim 11, wherein said condensing lens comprises a Fresnel lens.

13. A photometer for a reproduction machine according to claim 12, further comprising discrimination means for discriminating whether said document is a color printed document or a color photographic document, based on the values detected by said sensors.

14. A photometer for a reproduction machine according to claim 13, wherein said diffusion plate comprises frosted glass.

* * * * *